(12) United States Patent
Dievart et al.

(10) Patent No.: US 11,047,338 B2
(45) Date of Patent: Jun. 29, 2021

(54) TURBOFAN COMPRISING A LOW-SUPERCRITICAL-PRESSURE SHAFT

(71) Applicant: Safran Aircraft Engines, Paris (FR)

(72) Inventors: Jeremy Dievart, Moissy-Cramayel (FR); Yanis Benslama, Moissy-Cramayel (FR); Nathalie Nowakowski, Moissy-Cramayel (FR)

(73) Assignee: Safran Aircraft Engines, Paris (FR)

(*) Notice: Subject to any disclaimer, the term of this patent is extended or adjusted under 35 U.S.C. 154(b) by 370 days.

(21) Appl. No.: 16/085,086

(22) PCT Filed: Mar. 15, 2017

(86) PCT No.: PCT/FR2017/050596
§ 371 (c)(1),
(2) Date: Feb. 7, 2019

(87) PCT Pub. No.: WO2017/158294
PCT Pub. Date: Sep. 21, 2017

(65) Prior Publication Data
US 2019/0153978 A1 May 23, 2019

(30) Foreign Application Priority Data
Mar. 15, 2016 (FR) ...................... 1652176

(51) Int. Cl.
*F02C 7/06* (2006.01)
*F02K 3/06* (2006.01)

(52) U.S. Cl.
CPC .................. *F02K 3/06* (2013.01); *F02C 7/06* (2013.01); *F05D 2220/326* (2013.01); *F05D 2220/327* (2013.01); *F05D 2260/40311* (2013.01)

(58) Field of Classification Search
CPC ........ F02K 3/06; F02C 7/06; F05D 2220/326; F05D 2220/327; F05D 2260/40311
See application file for complete search history.

(56) References Cited

U.S. PATENT DOCUMENTS

| 2004/0047731 A1 | 3/2004 | Hull |
| 2011/0206498 A1 | 8/2011 | McCooey |
| 2012/0195753 A1 | 8/2012 | Davis et al. |

(Continued)

FOREIGN PATENT DOCUMENTS

| EP | 2 360 391 A1 | 8/2011 |
| WO | WO 2014/066815 A1 | 5/2014 |

OTHER PUBLICATIONS

International Search Report and Written Opinion dated Jun. 22, 2017 in PCT/FR2017/050596 (with English translation of Category of Cited Documents), citing documents AA, AB, AO, AP, AY and AZ therein, 20 pages.

(Continued)

*Primary Examiner* — Aaron R Eastman
(74) *Attorney, Agent, or Firm* — Oblon, McClelland, Maier & Neustadt, L.L.P.

(57) ABSTRACT

A turbofan engine including: a turbine shaft; a fan shaft; and a reduction mechanism coupling the turbine shaft and the fan shaft, is provided. The turbofan engine has a bypass ratio greater than or equal to 10, and the turbine shaft is supported by four bearings such that the flexural deformation modes of (Continued)

Figure 1:
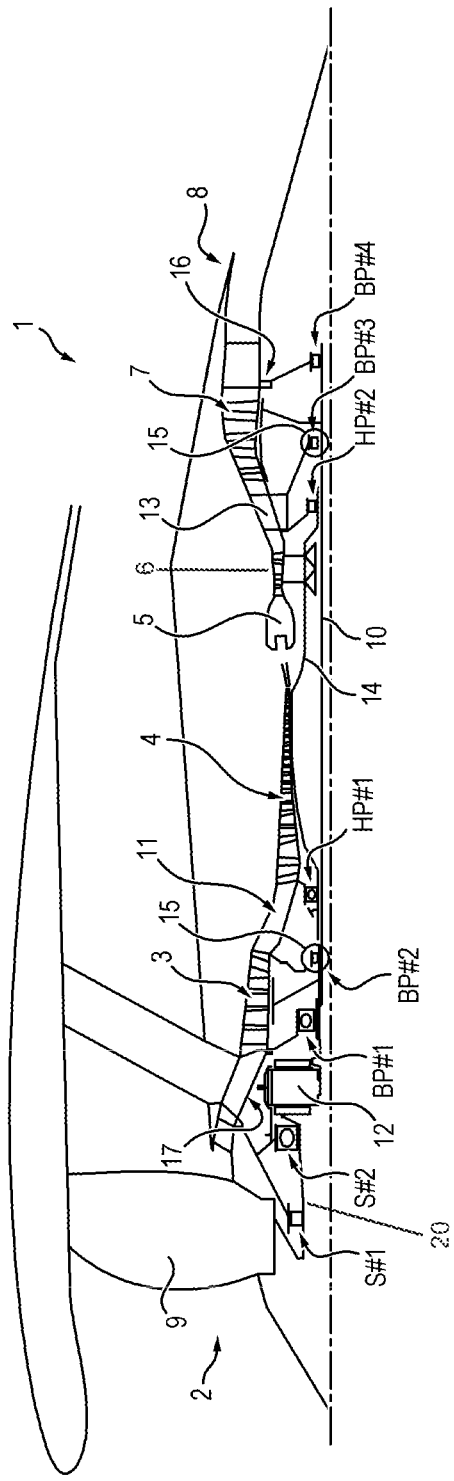

the turbine shaft are positioned in transient phase or outside the operating range of the turbofan engine.

15 Claims, 2 Drawing Sheets

(56) References Cited

U.S. PATENT DOCUMENTS

| | | | |
|---|---|---|---|
| 2013/0192195 A1* | 8/2013 | Wehmeier | F02K 1/1207 60/204 |
| 2013/0192199 A1* | 8/2013 | Merry | F02K 3/04 60/226.1 |
| 2013/0195647 A1* | 8/2013 | Muldoon | F02C 7/06 415/229 |
| 2014/0140824 A1 | 5/2014 | Sheridan | |
| 2014/0260326 A1* | 9/2014 | Schwarz | F02K 3/06 60/805 |
| 2015/0113943 A1* | 4/2015 | Schwarz | F02K 3/06 60/226.1 |
| 2015/0361878 A1* | 12/2015 | Schwarz | F01D 25/28 60/774 |
| 2016/0040598 A1* | 2/2016 | Morin | F02K 3/06 415/1 |
| 2016/0195022 A1* | 7/2016 | Schwarz | F02K 3/06 60/772 |

OTHER PUBLICATIONS

French Search Report dated Dec. 6, 2016 in French Patent Application No. 1652176 (with English translation of Category of Cited Documents), citing documents AA, AB, AO, AP, AY and AZ therein, 13 pages.

Sabnis, J., et al., "The PW1000G Pure Power® New Engine Concept and its Impact on MRO", Retrieved from the internet URL: http://events.aviationweek.com/html/mroeng10/Day2—The PW1000G Pure Power New Engine Concept.SABNIS(P&W).pdf, XP055155486, Dec. 1, 2010, pp. 1-45.

Kandebo, S.W., "Geared-Turbofan Engine Design Targets Cost, Complexity", Aviation Week and Space Technology, vol. 148 No. 8, XP008174450, Feb. 23, 1998, pp. 34-35.

* cited by examiner

TURBOFAN COMPRISING A LOW-SUPERCRITICAL-PRESSURE SHAFT

FIELD OF THE INVENTION

The invention relates to the field of turbomachines, and more particularly bypass turbofan engines having a high, or even very high, bypass ratio and a supercritical low-pressure shaft, that is, with a flexural deformation mode in the operating range.

TECHNOLOGICAL BACKGROUND

A bypass turbofan engine generally comprises, from upstream to downstream in the direction of the flow of gases, a ducted fan housed in a fan housing, a primary annular flow space and a secondary annular flow space. The air mass suctioned by the fan is therefore divided into a primary flow, which circulates in the primary flow space, and a secondary flow, which is concentric with the primary flow and circulates in the secondary flow space.

The primary flow space passes through a primary body comprising one or more compressor stages, for example a low-pressure compressor and a high-pressure compressor, a combustion chamber, one or more turbine stages, for example a high-pressure turbine and a low-pressure turbine, and a gas discharge nozzle.

Typically, the high-pressure turbine drives the high-pressure compressor in rotation by means of a first shaft, called high-pressure shaft, whereas the low pressure turbine drives the low-pressure compressor and the fan in rotation by means of a second shaft, called low-pressure shaft. The low-pressure shaft is generally housed in the high-pressure shaft.

To improve the propulsive output of the turbofan engine and reduce its specific consumption as well as any noise emitted by the fan, turbofan engines having a high bypass ratio have been proposed, that is, the ratio between the rate of the secondary flow and that of the primary flow. High bypass ratio here means a bypass ratio of over 10, for example between 12 and 18.

To achieve such dilution rates bypass ratios, the fan is disconnected from the low-pressure turbine, accordingly optimizing their respective speed of rotation independently. For example, the decoupling can be achieved by means of a reducer such as a star gear or planetary reduction mechanism, placed between the end upstream of the low-pressure shaft and the fan. The fan is driven by the low-pressure shaft by means of a reduction mechanism and an additional shaft, called fan shaft, which is fixed between the reduction mechanism and the disc of the fan.

This decoupling reduces the rotation speed and the pressure ratio of the fan, and boosts the power extracted by the low-pressure turbine.

The rotation speed of the low-pressure turbine in a turbofan engine comprising a reduction mechanism is therefore greater than the rotation speed of a low-pressure turbine in a conventional turbofan engine (that is, devoid of reduction mechanism) of equivalent power. The couple to be transmitted by the low-pressure shaft to the reduction mechanism is therefore less than in the case of the conventional turbofan engine, since turbofan engines operate at equivalent power but the low-pressure shaft turns faster. The low-pressure shaft can therefore have a smaller diameter, making for easier integration of the high-pressure body. However, the effect of this reduction in the diameter of the low-pressure shaft is to reduce the frequency of eigen modes, whereas increasing the rotation speed of the low-pressure shaft expands the operating range of the shaft. The result is that the low-pressure shaft is forced to exceed a critical speed which is predetermined and corresponds to a flexural deformation mode of the shaft in its operating range and starts to resonate. With resonance, which occurs during transition of the critical speed of the low-pressure shaft, the latter undergoes power surge phenomena which amplify deformations and forces caused by the unbalancing of the shaft. In these conditions, the shaft is called supercritical.

A turbomachine turning at a critical speed at stabilised speed risks rapid degradation. The aim therefore is to have critical speeds outside operating ranges when the turbomachine is at stabilised speed.

Modal analysis of the architecture of a given low-pressure shaft which conventionally has a front bearing and a rear bearing—determines the values of critical speeds, the form of the modal distortions and the distribution of the deformation energy between the components of the shaft line: the front and rear bearings and the shaft connecting these bearings. Reference could be made especially to FIG. 3 which illustrates modal analysis of a supercritical low-pressure shaft of a turbofan engine at high bypass ratio according to the prior art. This figure shows, in revolutions per minute, the ground speed (from 2000 to 4500 rpm), cruising speed (from 8500 to 9500 rpm), take-off speed (from 9000 to 9750 rpm) for an example of a turbofan engine having an absolute maximal speed encountered by the low-pressure shaft throughout the flight (or "redline") of 10000 rpm. In particular, this figure provides a critical speed value for the first flexural deformation mode of the low-pressure shaft, called mode $1f$ appears at a critical speed of the order of 5000 rpm. But to limit the zone of potential appearance of instabilities (non-synchronous vibrations), this mode $1f$ must be higher in frequency. Also, the second flexural deformation mode of the low-pressure shaft, called mode $2f$, occurs at a critical speed of the order of 11000 rpm, which is too close to the redline and results in overloading of the engine structure.

It is therefore necessary to dimension the low-pressure shaft to reject the deformation modes outside the operating ranges of the turbofan engine, or at least ensure that they occur in transient phase only, and therefore over a sufficiently short period to reduce the risk of damage to the turbofan engine. In fact, the appearance of such deformation modes can result in preventing the rise in speed of the engine due to the extensive reach of the low-pressure shaft and/or in generating nonsynchronous vibrations, resulting in an uncontrolled increase diverging from the dynamic response of the shaft beyond the critical speed corresponding to mode $1f$.

For this, it is especially possible to increase the diameter of the low-pressure shaft, although such an increase is not preferable in a turbofan engine at high bypass ratio, to the extent where it also involves an increase of the bulk of the main body, and therefore a drop in the bypass ratio.

SUMMARY OF THE INVENTION

An aim of the invention is therefore to propose a bypass turbofan engine and at high bypass ratio which has a sound dynamic situation, that is, whereof the deformation modes appear outside operating ranges, or at least only during transient phases of the turbofan engine.

For this, the invention proposes a bypass turbofan engine comprising:
- a turbine shaft,
- a fan shaft, and
- a reduction mechanism, coupling the turbine shaft and the fan shaft.

The turbofan engine has a dilution ratio greater than or equal to 10. Also, the turbine shaft is supported by four bearings such that the flexural deformation modes of the turbine shaft are positioned in transient phase or outside the operating range of the turbofan engine.

Some preferred though non-limiting characteristics of the turbofan engine described above are the following, taken individually or in combination:
- the turbofan engine also comprises, from upstream to downstream in the direction of flow of gases in the turbofan engine: a fan, driven by the fan shaft, a low-pressure compressor, driven by the turbine shaft, a high-pressure compressor, and a turbine, which drives in rotation the turbine shaft,
- the turbofan engine also comprises an inter-compressor housing, extending between the low-pressure compressor and the high-pressure compressor, and wherein a first of the four bearings which supports the turbine shaft is mounted on the inter-compressor housing,
- the turbofan engine also comprises a vein housing extending between the reduction mechanism and the low-pressure compressor, and wherein a second of the four bearings which supports the turbine shaft is mounted on the vein housing,
- the first of the four bearings is equipped with a supple cage and can also comprise an oil film damper, whereas the second of the four bearings is devoid of supple cage,
- the turbofan engine also comprises a discharge housing extending downstream from the turbine, and wherein a third of the four bearings is mounted on the discharge housing,
- the turbine comprises, from upstream to downstream, a high-pressure turbine and a low-pressure turbine separated by an inter-turbine housing, the fourth of the four bearings being mounted on the inter-turbine housing, upstream from the third bearing,
- the fourth of the four bearings is equipped with a supple cage and can also comprise an oil film damper, whereas the third of the four bearings is devoid of supple cage,
- the high-pressure compressor is driven by a high-pressure shaft, said high-pressure shaft being mounted on a front bearing, extending downstream from the first of the four bearings, and a rear bearing,
- the high-pressure compressor comprises at least eight rotor stages, for example between eight and twelve rotor stages,
- an overall compression ratio of the low-pressure compressor and of the high-pressure compressor is greater than or equal to 30, preferably greater than or equal to 40,
- the bypass ratio of the turbofan engine is between 12 and 18,
- a reduction ratio of the reduction mechanism is between 2.5 and 5, and/or
- an absolute maximal speed encountered by the turbine shaft is between 8000 revolutions per minute and 12 000 revolutions per minute, typically around 10 000 revolutions per minute.

BRIEF DESCRIPTION OF THE DIAGRAMS

Figure 2:
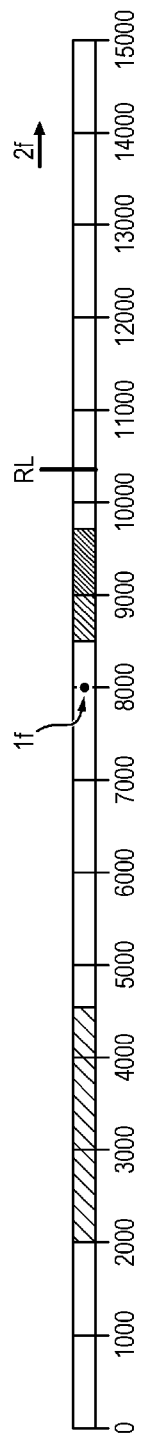
Figure 3:
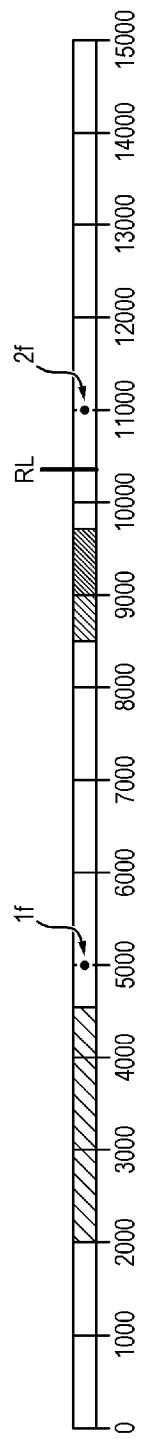

Other characteristics, aims and advantages of the present invention will emerge more clearly from the following detailed description and with respect to the appended drawings given by way of non-limiting examples and in which:

FIG. 1 is a schematic view of an embodiment of a turbofan engine according to the invention, FIG. 2 is a modal analysis of an embodiment of a supercritical low-pressure shaft of a turbofan engine at high bypass ratio according to the invention, and FIG. 3 is a modal analysis of a supercritical low-pressure shaft of a turbofan engine at high bypass ratio according to the prior art.

DETAILED DESCRIPTION OF AN EMBODIMENT

In the following, a turbofan engine 1 will now be described in reference to the attached figures.

The turbofan engine 1 conventionally comprises a fan 2 and a primary body. In the direction of flow of gases the primary body comprises a low-pressure compressor 3, a high-pressure compressor 4, a combustion chamber 5, a high-pressure turbine 6, a low-pressure turbine 7 and a discharge nozzle 8 for gas.

The fan 2 comprises a fan disc provided with fan blades 9 on its periphery, which, when set in rotation drive the airflow in the primary and secondary flow spaces of the turbofan engine 1. The fan 2 is supported by a low-pressure shaft 10 which is driven in rotation by the low-pressure turbine 7.

The turbofan engine 1 also comprises an intercompressor housing 11 whereof the hub is arranged between the housing of the low-pressure compressor 3 and the housing of the high-pressure compressor 4.

The turbofan engine 1 has a high bypass ratio, that is, a bypass ratio greater than or equal to 10, for example between 12 and 18, to improve the propulsive output of the turbofan engine 1, and reduce its specific consumption and noise emitted by the fan 2.

For this reason, the fan 2 is disconnected from the low-pressure turbine 7 by means of a reduction mechanism 12. The fan 2 is driven by the low-pressure shaft 10 by means of a reducer of star gear or planetary type, placed between the upstream end of the low-pressure shaft 10 and the fan 2 and a fan shaft 20 which is fixed between the reduction mechanism 12 and the disc of the fan 2.

To calculate the dilution ratio, the rate of the secondary flow and the rate of the primary flow are measured when the turbofan engine 1 is stationary at take-off speed in a standard atmosphere (such as defined by the manual of the International Civil Aviation Organisation (OACI), Doc 7488/3, 3rd edition) and at sea level.

In an embodiment, the reduction mechanism 12 comprises a star gear reduction mechanism 12.

The reduction ratio of the reduction mechanism 12 is preferably between 2.5 and 5.

The diameter of the fan 2 can be between eighty inches (203.2 centimeters) and one hundred inches (254.0 centimeters), preferably between eighty inches (203.2 centimeters) and ninety inches (228.6 centimeters).

The deformation modes of the turbofan engine 1 depend especially on the sizing of the low-pressure shaft 10 and the absolute maximal speed encountered by the low-pressure shaft 10 throughout ("redline", RL).

The redline RL of the low-pressure shaft 10 is fixed during the manufacturing phase of the turbofan engine 1. In this case, the redline RL is between 8000 revolutions per minute and 12 000 revolutions per minute, typically around 10 000 revolutions per minute.

In conventional terms, the length of the low-pressure shaft 10 is fixed by the length of the high-pressure body, that is, the length of the high-pressure compressor 4, of the combustion chamber 5 and of the high-pressure turbine 6. Here, the high-pressure compressor 4 comprises a series of rotating discs (rotor stages), bladed or not, and a series of fixed blade discs (rectifying stages). More precisely, the high-pressure compressor 4 comprises at least eight rotor stages, for example between eight and twelve rotor stages.

Also, the overall pressure ratio (OPR) of the compressor of the turbofan engine 1 is at least equal to 30, preferably greater than or equal to 40.

Overall pressure ratio OPR here means the ratio between the pressure at the intake of the low-pressure compressor 3 (or "booster") and the pressure at outlet of the high-pressure compressor 4.

Because of the high number of rotor stages in the high-pressure compressor 4 and the high overall pressure ratio OPR, the compressor of the turbofan engine 1 exhibits better power output without overloading the booster 3. Such a pressure ratio can especially be attained by way of the reduction mechanism 12 between the fan 2 and the low-pressure turbine 7, which reduces the mass of the turbofan engine 1.

The low-pressure shaft 10 is centred on the axis of the turbofan engine 1 by a series of bearings. In this case, the low-pressure shaft 10 is supported by four bearings BP #1, BP #2, BP #3, BP #4: in this configuration, the deformation modes of the low-pressure shaft 10 are shifted to transient speed of the turbofan engine 1, with safety margins relative to stabilised speeds. Reference could be made especially to FIG. 2 which illustrates modal analysis of a supercritical low-pressure shaft 10 of a turbofan engine 1 at high bypass ratio according to the invention, comprising successively four bearings BP #1, BP #2. BP #3 and BP #4. This figure shows, in revolutions per minute, the ground speed (from 2000 to 4500 rpm), the cruising speed (from 8500 to 9500 rpm), the take-off speed (from 9000 to 9750 rpm) for an example of turbofan engine 1 having a redline RL of 10000 rpm. Also, the first flexural deformation mode if appears, for this turbofan engine 1 comprising four bearings BP #1, BP #2, BP #3 and BP #4, at 8000 rpm, whereas the second mode $2f$ appears beyond the redline RL. In an embodiment, the second mode $2f$ appears beyond 110% of the redline RL to ensure a safety margin.

The bearing BP #1 corresponds to the bearing farthest from the low pressure shaft 10 whereas the bearing BP #4 is the bearing farthest downstream. The bearings BP #2 and BP #3 therefore extend between the bearing BP #1 and the bearing BP #2.

The applicant accordingly noticed that the position of the bearing BP #2 and of the bearing BP #3 had a strong influence on the deformation modes of the low pressure shaft 10.

In this way, the bearing BP #3, which is adjacent to the bearing BP #4, can be mounted both on the low-pressure shaft 10 and also on the inter-turbine housing 13 (that is, on the housing extending between the housing containing the high-pressure turbine 6 and the housing containing the low-pressure turbine 7), upstream from the low-pressure turbine 7. In an embodiment, the bearing BP #3 extends downstream from the bearing HP #2, which is the bearing farthest downstream on the high-pressure shaft 14.

The bearing BP #2, which extends between the bearing BP #1 and the bearing BP #3 in the direction of flow of gases in the turbofan engine 1, can be mounted both on the low-pressure shaft 10 and also part on the inter-compressor housing 11, or between the booster 3 and the high-pressure compressor 4. In an embodiment, the bearing BP #2 extends upstream from the bearing HP #1 which is the bearing farthest upstream on the high-pressure shaft 14.

The position of the bearings BP #1 and BP #4 can be conventional. For example, as seen in FIG. 1, the bearing BP #1, located farthest upstream on the low-pressure shaft 10, can be mounted both on the low-pressure shaft 10 and also part on the vane housing 17 which extends between the reduction mechanism 12 and the booster 3.

The bearing BP #4, which is located farthest downstream on the low-pressure shaft 10, can be mounted both on the low-pressure shaft 10 and also on the discharge housing 16 of the turbofan engine 1.

As seen in FIG. 2, mounting the low-pressure shaft 10 on four bearings BP #1, BP #2, BP #3 and BP #4 (rather than two or three bearings, as in the prior art), and judiciously placing the bearings BP #2 and BP #3, effectively shifts the flexural deformation modes $1f$, $2f$ of the low-pressure shaft 10: the mode $1f$ is positioned in a transient phase of the operating range and with safety margins relative to stabilised speeds whereas the mode $2f$ is positioned outside the operating range and with a comfortable margin relative to the redline RL. In other terms, the low-pressure shaft 10 stays at critical speed only very briefly. Typically, the mode if can be placed between ground idling and cruising/take-off speeds. At take-off, the turbofan engine shifts from an idling speed close to the minimum of the engine to a speed take-off near the Redline: the critical speed of the low-pressure shaft is therefore likely to appear during transition between these two speeds.

It also becomes possible, without as such risking a flexural deformation mode appearing at stabilised speed, to reduce the diameter of the low-pressure shaft 10 and therefore the bulk of the primary body to achieve, with the reduction mechanism 12 and the considerable diameter of the fan 2, a high bypass ratio for the turbofan engine 1. Typically, the low-pressure shaft 10 can have an external diameter of under fifty millimeters, typically under forty-five millimeters.

This positioning of the bearings BP #1, BP #2, BP #3, BP #4 also reduces clearance usage (radial displacement) of the booster 3, the latter now being placed between the two bearings BP #2 and BP #3.

In an embodiment, the bearing BP #1 can be devoid of supple cage 15 (also known by the name cage squirrel) and oil squeeze film damper.

Oil squeeze film damper here means a housing formed in a support housing of the corresponding bearing and wherein the external ring of the bearing is mounted with slight radial play. An annular space delimited around the ring in this housing is filled with oil and is closed axially by annular sealing elements which are free in rotation in annular throats of the external ring of the bearing and which cooperate as a seal with an internal cylindrical surface of the housing. Oil intake orifices are formed in the housing and terminate in the abovementioned annular space and oil discharge orifices are formed in the annular sealing elements and terminate outside this annular space to have oil circulating continuously in the annular space and cooled down outside this space to evacuate thermal energy dissipated by friction resulting from compression of a film of oil by the external ring of the bearing during its orbital movements in the abovementioned housing. The supple cage 15 as such is generally made solid with the external ring of the bearing. Reference could be made especially to document FR 2 876 758 in the name of the applicant, which describes a bearing embodiment comprising an oil squeeze film damper and a supple cage.

The absence of supple cage 15 and oil squeeze film damper therefore makes for easier integration of the bearing BP #1, to the extent where the space available in the region of the booster 3 is relatively narrow.

A supple cage 15 and an oil squeeze film damper can however be placed on the bearing BP #2. This supple cage 15 can easily be integrated into this bearing BP #2, the space between the intercompressor housing 11 and the low-pressure shaft 10 being greater than in the region of the booster 3.

In a variant embodiment, a supple cage 15 and an oil film damper can also be placed on the bearing BP #3, where the available space is also greater.

This configuration better dampens the vibrations of the low-pressure shaft 10, the oil film damper being more effective in this position. At the critical speed, the low-pressure shaft does not orbit in the region of the nodes and its orbiting is maximal in the region of the underside; approaching the oil squeeze film damper from the underside therefore heightens its efficacy as the articulation in the oil film is greater.

Optionally, the fourth bearing can also be devoid of supple cage 15 and oil film damper. In this variant embodiment, only the bearings BP #2 and BP #3 are therefore equipped with a supple cage 15 and an oil film damper.

The invention claimed is:

1. A bypass turbofan engine comprising:
   a turbine shaft,
   a fan shaft, and
   a reduction mechanism, coupling the turbine shaft and the fan shaft,
   wherein the turbofan engine has a bypass ratio greater than or equal to 10,
   wherein the turbine shaft is supported by four bearings such that flexural deformation modes of the turbine shaft are positioned in transient phase or outside an operating range of the turbofan engine,
   wherein the turbofan engine further comprises, from upstream to downstream in a direction of flow of gases in the turbofan engine:
      a fan driven by the fan shaft,
      a low-pressure compressor driven by the turbine shaft,
      a high-pressure compressor, and
      a turbine, which drives in rotation the turbine shaft,
   wherein the turbofan engine further comprises an inter-compressor housing extending between the low-pressure compressor and the high-pressure compressor,
   wherein a first of the four bearings which supports the turbine shaft is mounted on the inter-compressor housing,
   wherein the turbofan engine further comprises a casing extending between the reduction mechanism and the low-pressure compressor,
   wherein a second of the four bearings which supports the turbine shaft is mounted on the casing,
   wherein the turbofan engine further comprises a discharge casing extending downstream from the turbine, and
   wherein a third of the four bearings is directly mounted on the discharge casino.

2. The turbofan engine according to claim 1, wherein the first of the four bearings comprises a flexible cage, whereas the second of the four bearings is devoid of a flexible cage.

3. The turbofan engine according to claim 1, wherein the turbine comprises, from upstream to downstream, a high-pressure turbine and a low-pressure turbine separated by an inter-turbine casing, a fourth of the four bearings being mounted on the inter-turbine casing, upstream from the third of the fourth bearings.

4. The turbofan engine according to claim 3, wherein the fourth of the four bearings comprises a flexible cage and, whereas the third of the four bearings is devoid of a flexible cage.

5. The turbofan engine according to claim 3, wherein the fourth of the four bearings further comprises an oil film damper.

6. The turbofan engine according to claim 1, wherein the high-pressure compressor is driven by a high-pressure shaft, said high-pressure shaft being mounted on a front bearing and a rear bearing, wherein the front bearing extends downstream from the first of the four bearings.

7. The turbofan engine according to claim 1, wherein the high-pressure compressor comprises at least eight rotor stages.

8. The turbofan engine according to claim 7, wherein an overall compression ratio of the low-pressure compressor and of the high-pressure compressor is greater than or equal to 30.

9. The turbofan engine according to claim 7, wherein an overall compression ratio of the low-pressure compressor and of the high-pressure compressor is greater than or equal to 40.

10. The turbofan engine according to claim 1, wherein a bypass ratio of the turbofan engine is between 12 and 18.

11. The turbofan engine according to claim 1, wherein a reduction ratio of the reduction mechanism is between 2.5 and 5.

12. The turbofan engine according claim 1, wherein an absolute maximal speed encountered by the turbine shaft is between 8000 revolutions per minute and 12 000 revolutions per minute.

13. The turbofan engine according to claim 1, wherein the high-pressure compressor comprises between eight and twelve rotor stages.

14. The turbofan engine according to claim 1, wherein an absolute maximal speed encountered by the turbine shaft is around 10 000 revolutions per minute.

15. The turbofan engine according to claim 1, wherein the first of the four bearings further comprises an oil film damper.

* * * * *